United States Patent
Nakazumi et al.

(10) Patent No.: US 9,548,679 B2
(45) Date of Patent: Jan. 17, 2017

(54) VIBRATION ACTUATOR HAVING IMPROVED TORQUE

(71) Applicant: NIKON CORPORATION, Tokyo (JP)

(72) Inventors: Makoto Nakazumi, Yamato (JP); Masaaki Tanabe, Yokohama (JP)

(73) Assignee: NIKON CORPORATION, Tokyo (JP)

(*) Notice: Subject to any disclaimer, the term of this patent is extended or adjusted under 35 U.S.C. 154(b) by 670 days.

(21) Appl. No.: 14/021,234

(22) Filed: Sep. 9, 2013

(65) Prior Publication Data
US 2014/0009667 A1    Jan. 9, 2014

Related U.S. Application Data

(63) Continuation of application No. PCT/JP2012/001509, filed on Mar. 5, 2012.

(30) Foreign Application Priority Data

Mar. 9, 2011 (JP) ................. 2011-052032

(51) Int. Cl.
*H02N 2/04* (2006.01)
*H02N 2/10* (2006.01)
(Continued)

(52) U.S. Cl.
CPC ............... *H02N 2/105* (2013.01); *G02B 7/04* (2013.01); *G02B 7/08* (2013.01); *H02N 2/0065* (2013.01);
(Continued)

(58) Field of Classification Search
CPC ...... H02N 2/105; H02N 2/0065; H02N 2/106; H02N 2/026; H02N 2/123; H02N 2/163
(Continued)

(56) References Cited

U.S. PATENT DOCUMENTS 5,148,068 A * 9/1992 Kushida ............... H01L 41/12
                                            310/323.04
5,172,023 A * 12/1992 Kawai ..................... H02N 2/163
                                            310/323.04
(Continued)

FOREIGN PATENT DOCUMENTS

JP    2000-175466    6/2000
JP    2004-236493    8/2004
JP    2005-287246    10/2005

OTHER PUBLICATIONS

Chinese Office Action dated Nov. 24, 2015 in corresponding Chinese Patent Application No. 201280010978.5.
(Continued)

*Primary Examiner* — J. San Martin

(57) ABSTRACT

Provided is a vibration actuator including: an electromechanical transduction member that transduces electric power to a mechanical vibration; a transmission member that transmits the vibration from the electromechanical transduction member as a driving force; and an abutting portion that abuts on the transmission member and moves relative to the transmission member in response to the driving force. One of the transmission member and the abutting portion includes pores in its surface contacting the abutting portion or the transmission member at an area occupancy of 2% or higher. In this vibration actuator, the average area of the pores may be 3 $\mu m^2$ or larger. The other of the transmission member and the abutting portion may include iron in its surface contacting the one.

12 Claims, 8 Drawing Sheets

(51) Int. Cl.
*G02B 7/08* (2006.01)
*H02N 2/00* (2006.01)
*H02N 2/02* (2006.01)
*H02N 2/12* (2006.01)
*H02N 2/16* (2006.01)
*G02B 7/04* (2006.01)

(52) U.S. Cl.
CPC .............. *H02N 2/026* (2013.01); *H02N 2/106* (2013.01); *H02N 2/123* (2013.01); *H02N 2/16* (2013.01); *H02N 2/163* (2013.01)

(58) Field of Classification Search
USPC ........... 310/323.11, 323.02, 323.09, 323.016
See application file for complete search history.

(56) References Cited

U.S. PATENT DOCUMENTS

| | | | | |
|---|---|---|---|---|
| 5,187,406 A * | 2/1993 | Seki | ........................ | H02N 2/163 310/323.11 |
| 5,338,998 A * | 8/1994 | Kitani | .................... | H02N 2/163 310/323.09 |
| 5,363,006 A * | 11/1994 | Yano | ....................... | H02N 2/163 310/323.11 |
| 6,628,046 B2 * | 9/2003 | Seki | ........................ | H02N 2/106 310/323.04 |
| 6,888,288 B2 * | 5/2005 | Seki | ........................ | H02N 2/106 310/323.16 |

OTHER PUBLICATIONS

Chinese Office Action issued Feb. 13, 2015 in corresponding Chinese Patent Application No. 201280010978.5.
International Search Report mailed Jun. 5, 2012 in corresponding International Application No. PCT/JP2012/001509.
Japanese Office Action dated Jul. 7, 2015 in corresponding Japanese Patent Application No. 2013-503388.
Chinese Office Action dated May 11, 2016 in corresponding Chinese Patent Application No. 201280010978.5.

* cited by examiner

VIBRATION ACTUATOR HAVING IMPROVED TORQUE

CROSS-REFERENCE TO RELATED APPLICATIONS

This application is a U.S. continuation application filed under 35 USC §111(a) claiming benefit of PCT Application No. PCT/JP2012/001509, filed Mar. 5, 2012, and claims foreign priority benefit of Japanese Application No. JP2011-052032, filed Mar. 9, 2011, the entire contents of both of which are incorporated herein by reference.

BACKGROUND

1. Technical Field

The present invention relates to a vibration actuator.

2. Related Art

There is a vibration actuator that includes: a vibrator that generates two flexural vibrations each perpendicular to the center axis of a shaft; and a rotor that rotates about the shaft being frictionally driven by the vibrator (see Patent Document 1).

Patent Document 1 Japanese Patent Application Publication No. 2005-287246

A vibration actuator cannot generate a large drive torque if the portions of the vibrator and rotor that contact each other are formed of a rigid material having abrasion resistance.

SUMMARY

Therefore, it is an object of an aspect of the innovations herein to provide a vibration actuator, which is capable of overcoming the above drawback accompanying the related art. The above and other objects can be achieved by combinations described in the main claims. Sub-claims provide further advantageous specific features of the present invention.

According to one aspect of the present invention, provided is a vibration actuator including: an electromechanical transduction member that transduces electric power to a mechanical vibration; a transmission member that transmits the vibration of the electromechanical transduction member as a driving force; and an abutting portion that abuts on the transmission member and moves relative to the transmission member in response to the driving force, wherein one of the transmission member and the abutting portion includes pores in its surface contacting the abutting portion or the transmission member at an area occupancy of 2% or higher.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
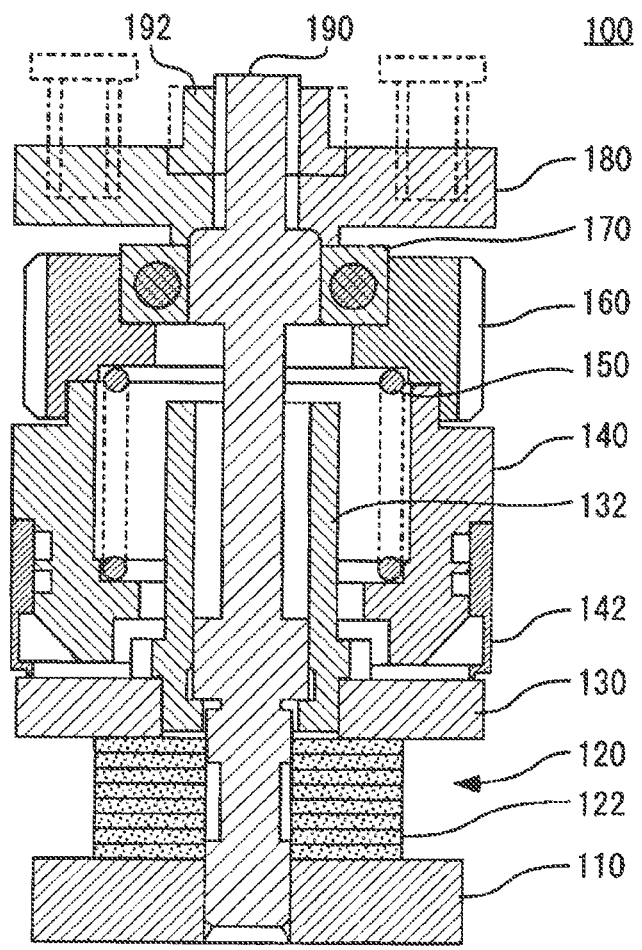
FIG. 1 is an exemplary cross-sectional diagram of a vibration actuator 100.

FIG. 1 is an exemplary cross-sectional diagram of a vibration actuator 100. In the description to follow, the orientation of each element will be described by regarding the upper side of the drawing as "upper or top side" and the lower side of the drawing as "lower or bottom side". However, such descriptions do not imply that the vibration actuator 100 is to be used only in the orientation shown in the drawing.

The vibration actuator 100 includes a base plate 110, a piezoelectric stack 120, a stator 130, a rotor 140, an output gear 160, and a top plate 180, which are coaxially stacked in order. A shaft 190 pierces the center of these members.

The bottom end of the shaft 190 is joined to the base plate 110. The top plate 180 is clenched downward along the axial direction of the shaft 190 by a nut 192. The piezoelectric stack 120, the stator 130, the rotor 140, and the output gear 160 are pushed against each other in the axial direction of the shaft 190, being sandwiched between the base plate 110 and the top plate 180.

The piezoelectric stack 120 includes a plurality of electromechanical transduction members 122 stacked upon each other in the thickness direction, and is supported by the base plate 110 at the bottom thereof. The stator 130 is stacked on the top of the piezoelectric stack 120. Hence, the stator 130 is supported by the piezoelectric stack 120 at the bottom thereof. The top of the stator 130 provides a surface to contact the rotor 140.

The stator 130 is joined to the bottom end of a vibrator 132 that is disposed coaxially with the shaft 190. Hence, when the stator 130 wobbles, the vibrator 132 also wobbles together. Regarding the wobble of the stator 130 as vibration, the vibrator 132 and the stator 130 constitutes one vibration system. Therefore, it is possible to adjust the eigen frequency of the stator 130 by changing the dimensions and mass of the vibrator 132.

The rotor 140 abuts on the top of the stator 130 with its abutting portion 142. The abutting portion 142 is secured to the rotor 140, and rotates together with the rotor 140 when the rotor 140 rotates about the shaft 190. The abutting portion 142 is made of an elastic material. Therefore, when the stator 130 vibrates in the axial direction of the shaft 190, the abutting portion 142 keeps in contact with the stator 130, following the surface of the stator 130 on which it abuts.

The top end of the rotor 140 is engaged with the bottom of the output gear 160 in the direction of rotation about the shaft 190. Therefore, when the rotor 140 rotates about the shaft 190, the output gear 160 also rotates following the rotor 140.

The output gear 160 is supported on the shaft 190 through a bearing member 170. Therefore, even under a load, the output gear 160 can smoothly rotate about the shaft 190. The peripheral surface of the output gear 160 is formed into pinion gear-shape, allowing rotation of the output gear 160 to be transmitted outward.

A biasing member 150 is, for example, a coil spring biased in a to-be-elongated direction, and abuts on the bottom of the output gear 160 at its one end. The bottom end of the biasing member 150 abuts on an upward-facing step formed in the inner surface of the rotor 140.

The output gear 160 abuts on the bearing member 170 at an upward-facing step formed in the inner surface thereof, and the top of the bearing member 170 abuts on the top plate 180. Therefore, the output gear 160 does not move upward. In other words, the biasing member 150 biases the rotor 140 toward the stator 130.

Figure 2:
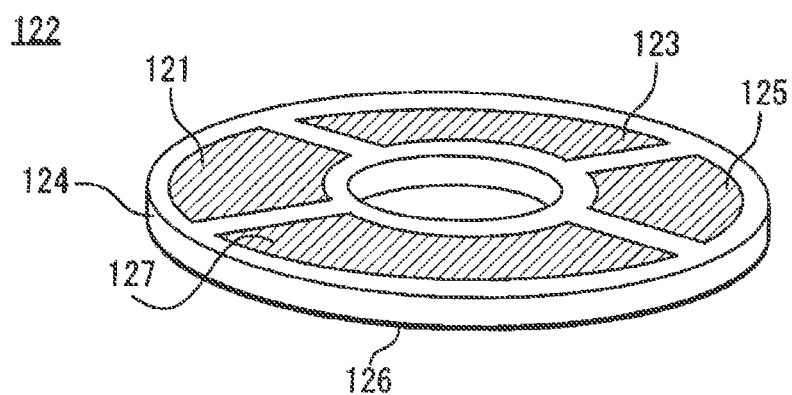
FIG. 2 is a perspective diagram of an electromechanical transduction member 122.

FIG. 2 is a perspective view of an electromechanical transduction member 122 constituting the piezoelectric stack 120. Each electromechanical transduction member 122 includes a piezoelectric material plate 124, driving electrodes 121, 123, 125, and 127, and a common electrode 126.

The piezoelectric material plate 124 is a disk-shaped member made of a piezoelectric material such as PZT, etc. The bottom surface of the piezoelectric material plate 124 is covered entirely with the common electrode 126. The top surface of the piezoelectric material plate 124 includes the plurality of driving electrodes 121, 123, 125, and 127 which are provided dividedly in the circumferential direction. It is possible to form the driving electrodes 121, 123, 125, and 127, and the common electrode 126 directly on the surfaces of the piezoelectric material by applying electrode materials such as nickel, gold, etc. to the surfaces by plating, vapor deposition, thick film printing, etc.

For example, when the potential of the common electrode 126 is fixed at a ground potential and a driving voltage is applied to any of the driving electrodes 121, 123, 125, and 127, the thickness of the piezoelectric material plate 124 changes only in the region of that one of the driving electrodes 121, 123, 125, and 127.

The piezoelectric stack 120 is formed of a plurality of such electromechanical transduction members 122 stacked upon each other with an insulating layer interposed in-between. In the plurality of electromechanical transduction members 122 of the piezoelectric stack 120, the same driving voltage is applied at the same timing to the driving electrodes 121, 123, 125, or 127 located at the same position.

FIG. 3, FIG. 4, FIG. 5, and FIG. 6 are diagrams explaining the operation of the piezoelectric stack 120 in the vibration actuator 100. Any members that are common between these diagrams and FIG. 1 will be denoted by the same reference numerals, and the same explanation will not be repeated.

When a driving voltage is selectively applied to any of the plurality of driving electrodes 121, 123, 125, and 127 of the electromechanical transduction members 122 of the piezoelectric stack 120, thickness changes of the piezoelectric material plates 124 are coupled at the position of that driving electrode 121, 123, 125, or 127. This changes the inclination of the stator 130 with respect to the base plate 110.

Figure 3:
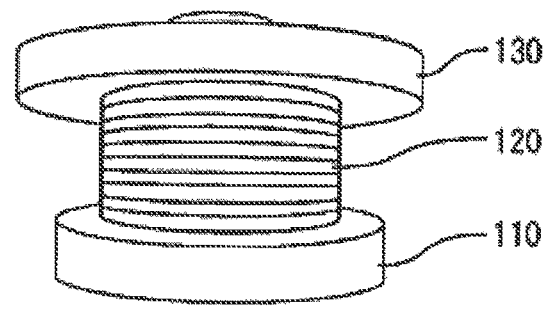
FIG. 3 is a diagram explaining an operation of the vibration actuator 100.

In the state shown in FIG. 3, a voltage for expanding the piezoelectric material is applied to the driving electrode 127 at the near side of the drawing sheet, and a voltage for shrinking the piezoelectric material is applied to the driving electrode 123 at the far side of the drawing sheet. In response, the stator 130, which has initially been parallel with the base plate 110, is inclined to the far side of the drawing sheet as shown.

Figure 4:
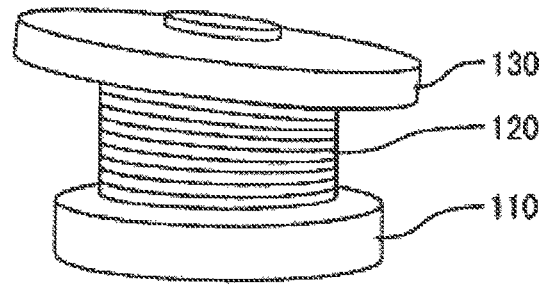
FIG. 4 is a diagram explaining an operation of the vibration actuator 100.
Figure 5:
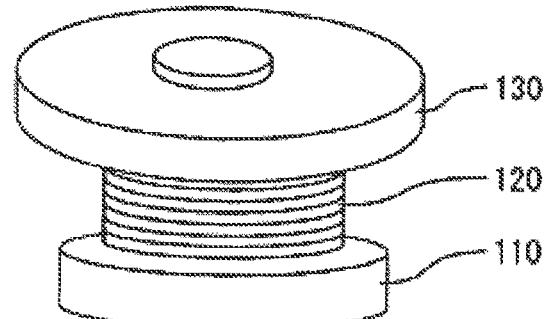
FIG. 5 is a diagram explaining an operation of the vibration actuator 100.
Figure 6:
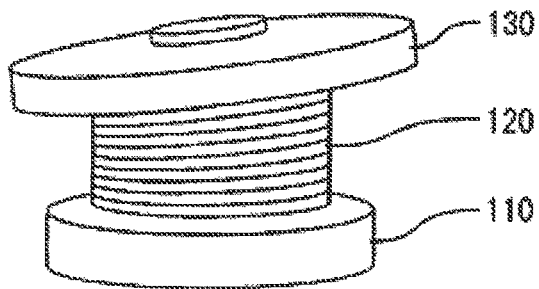
FIG. 6 is a diagram explaining an operation of the vibration actuator 100.

Then, by switching the driving electrodes 121, 123, 125, and 127 to which a voltage is applied sequentially in the clockwise direction of the stator 130 seen from above, it is possible to turn the directions to which the stator 130 is inclined clockwise as shown in FIG. 4 to FIG. 6. When the order of applying voltages is reversed, the direction in which the stator 130 turns the inclination directions is reversed.

Referring to the vibration actuator 100 of FIG. 1 again, the rotor 140 is biased by the biasing member 150, which makes the abutting portion 142 constantly pushed against the stator 130. Therefore, the stator 130 that is wobbling by turning the directions to which it inclines frictionally drives the rotor 140 to rotate.

Here, the rotor 140 rotates reversely to the direction in which the stator 130 turns the inclination directions. Hence, when the inclination directions of the stator 130 when the vibrator actuator 100 is seen from above is turned clockwise as described above, the rotor 140 rotates counterclockwise. The construction of the vibration actuator 100, in which the rotor 140 rotates when driving voltages are supplied to the piezoelectric stack 120, is as described above.

It is preferable that the frequency of the driving voltage of the vibration actuator 100 be similar to the eigen frequencies of the members that vibrate when the vibration actuator 100 operates, such as the piezoelectric stack 120, the stator 130, the vibrator 132, the shaft 190, etc. With such a frequency, it is possible to generate a driving force in a power-efficient manner with respect to the power supplied.

The rotary drive force generated by the vibration actuator 100 is induced by a force of friction between the stator 130 and the rotor 140. Here, according to the principle "F (frictional force)=μ (friction coefficient)×N (load)", a relationship of F∝μ is established on a condition that the load N is constant. Therefore, by causing a large friction between the stator 130 and the rotor 140, it is possible to improve the driving efficiency of the vibration actuator 100 and generate a large output torque.

In the vibration actuator 100 described above, the abutting portion 142 of the rotor 140 may be made of martensite stainless steel such as SUS420J2, etc. which can be an elastic material when quenched, and SUS431, 403, 410, 420, 440, etc. Further, the abutting portion 142 may also be made of other stainless steels, for example, austenite stainless steel such as SUS304, or iron alloy, etc. depending on the specifications of the vibration actuator 100.

The stator 130 may be made of ceramics obtained by sintering powders of a metal oxide, a metal nitride, a metal carbide, etc. More specifically, the stator 130 may be made of a material that contains any one of aluminum oxide, zirconium oxide, magnesium oxide, silicon oxide, titanium nitride, silicon carbide, and silicon nitride, or any two or more of them.

Ceramics is unsusceptible to deformation and has a high abrasion resistance, but inevitably includes voids because it is produced by a solid-phase reaction of the material powders. Therefore, the surface of the stator 130 made of ceramics has voids called pores. It has been found that difference of the surface property of the stator 130 due to the pores influences the output characteristics of the vibration actuator 100. Hence, the influences to the characteristics of the vibration actuator 100 were examined by preparing a plurality of stators 130 labeled as Samples 1 to 7, which were made of ceramics having different area occupancy (%) of the pores on the surface.

When manufacturing a stator 130 from ceramics, it is possible to adjust the area occupancy of pores and the average area of pores by selecting the grain size of the material powders to be used. For example, when a material powder with a smaller grain size is sintered, the ceramics to be obtained will have a denser structure, with a smaller area occupancy of pores and a smaller average area of pores on the surface. When a material powder with a larger grain size is sintered, the ceramics to be obtained will have a larger area occupancy of pores and a larger average area of pores on the surface.

Further, it is also possible to adjust the area occupancy of pores and the average area of pores more finely by mixing material powders with different grain sizes and changing the grain size distribution. It is also possible to adjust the area occupancy of pores and the average area of pores by changing, in addition to or instead of the grain size, sintering conditions such as a sintering time, a sintering temperature, a sintering pressure, etc.

The above method for adjusting the area occupancy of pores and the average area of pores can be used when a stator 130 is to be made from ceramics, and also when a stator 130 is to be made from a sintered alloy by using powder metallurgy technique. Further, it is also possible to create a surface texture with an intended area occupancy of pores and an intended average area of pores on a stator 130 manufactured by any other method than sintering, by etching the stator with an etchant suitable for the material.

The area occupancy of pores is a quotient of the sum total of the areas of pores observed from the surface of the stator 130 by an optical microscope with a magnification of 1000× by the area of the entire surface of the stator 130. However, it takes a long time to observe the surface of the stator 130 thoroughly at the magnification of 1000×.

Hence, in the observation by the optical microscope at the magnification of 1000×, pores present in a range of 300 μm×220 μm were extracted. The sum of the areas of these pores was divided by the area of the field of view, resulting in the area occupancy of the pores. Area occupancies of pores were calculated for randomly selected three points and averaged.

More specifically, the pores of the samples were quantified in the following procedure. A digital microscope (VHX-900 available from Keyence Corporation) was used for observation of the samples. This digital microscope includes a zoom lens with a coaxial episcopic illuminator system, and a CCD camera, and allows bright-field observation at the maximum magnification of 1000×.

The CCD camera is a 1/1.8-inch 2.11M pixel image sensor with an effective resolution of 1600×1200. In the actual observation, a region of 300 μm×220 μm on the stator surface was captured as image data of 1600×1200 dots at the zoom lens magnification of 1000×, at AUTO electronic shutter mode (shutter speed) and AUTO white balance, with the diaphragm opened, and at the frame rate of 15 F/S.

The data was imported into an image processing software application (Image-J), converted to 8-bit gray scale (0 to 255), and binarized, and only pore regions were extracted. In this process, the threshold for binarization was adjusted manually by checking the image to convert, so that only pore regions may be extracted. In the quantification here, the threshold for binarization was 70 for Samples 4 and 6, and 95 for the other samples.

After pore regions were extracted in this manner, the total number and total area of pores were calculated by using the functions of the image processing software application to derive the area occupancy of pores. Further, the total area of pores was divided by the total number of pores to derive the average area of pores.

In this manner, seven stators 130 with different area occupancies of pores were prepared. The area occupancy of pores and the average area of pores of each stator 130 are shown in Table 1. The material of each stator 130 is also shown in Table 1.

TABLE 1

| SAMPLE NUMBER | AREA OCCUPANCY OF PORES (%) | AVERAGE AREA OF PORES (μm$^2$) | NAME (MAIN COMPOSITION) |
|---|---|---|---|
| SAMPLE 1 | 1.30 | 0.637 | CERMET (TITANIUM CARBIDE-TITANIUM NITRIDE) |
| SAMPLE 2 | 1.75 | 0.604 | SILICON CARBIDE (SILICON CARBIDE) |
| SAMPLE 3 | 2.10 | 0.436 | ZIRCONIA (ZIRCONIA) |
| SAMPLE 4 | 4.10 | 0.268 | AlTiC (ALUMINA-TITANIUM CARBIDE) |
| SAMPLE 5 | 7.50 | 3.728 | ALUMINA 1 (Al$_2$O$_3$, IMPURITY OF 4% OR LOWER) |
| SAMPLE 6 | 10.3 | 7.669 | ALUMINA 2 (Al$_2$O$_3$, IMPURITY OF 10% OR LOWER) |
| SAMPLE 7 | 15.00 | 3.996 | ALUMINA 3 (Al$_2$O$_3$, IMPURITY OF 0.3% OR LOWER) |

Torque reduction ratio (rpm/mN·m) and an amount of iron components attached were measured with respect to vibration actuators 100 with the seven stators 130 respectively. The result of measurement is shown in Table 2.

TABLE 2

| SAMPLE NUMBER | TORQUE ATTENUATION RATIO (rpm/N · mm) | AMOUNT OF IRON COMPONENTS ATTACHED |
|---|---|---|
| SAMPLE 1 | 35.8 | 0.27 |
| SAMPLE 2 | 44.2 | 0.17 |
| SAMPLE 3 | 42.5 | 1.84 |
| SAMPLE 4 | 28.3 | 3.01 |
| SAMPLE 5 | 16.7 | 9.3 |
| SAMPLE 6 | 20.3 | 10.8 |
| SAMPLE 7 | 22.6 | 8.84 |

The torque reduction ratio shown in Table 2 was calculated according to Equation 1 below.

Torque reduction ratio=Reduction in rotational speed (rpm)/Load torque (N·mm)     Equation 1

Figure 7:
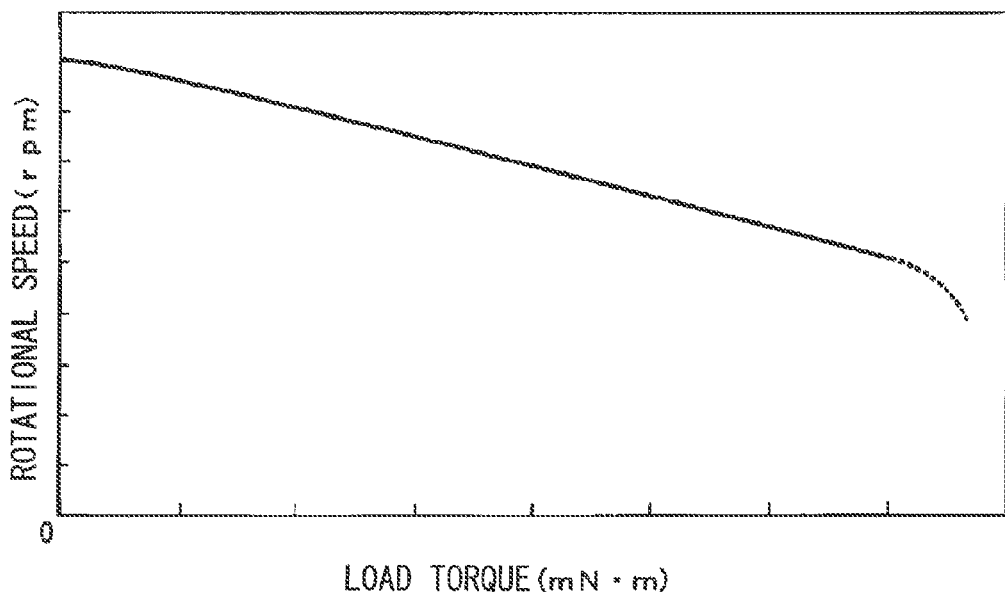
FIG. 7 is a graph showing the concept of torque reduction ratio.

FIG. 7 is a graph showing the concept of the torque reduction ratio of the vibration actuator 100. In the graph of FIG. 7, the horizontal axis represents load torque and the vertical axis represents the rotational speed. As the load torque is increased from 0 (N·mm) as shown in the graph while rotating the vibration actuator 100, the rotational speed (rpm) of the vibration actuator 100 decreases gradually. The torque reduction ratio indicates the ratio of the decrease of the rotational speed of the vibration actuator to the increase of the load torque, i.e., the slope of the graph of FIG. 7. A vibration actuator 100 with a low torque reduction ratio has a small reduction in the rotational speed when the load is increased. Therefore, such a vibration actuator can keep a high rotational speed with respect to a large load torque.

The torque reduction ratio was measured and calculated when the characteristics of the vibration actuator 100 were stabilized after some time of use. The torque reduction ratio was calculated from a range in which the number or rotations decreases linearly with respect to the load torque, specifically, in a range in which the load torque is 6 mN·m or less.

In the vibration actuator 100 including the stator 130 made of ceramics and the abutting portion 142 made of stainless, iron components attach to the stator 130 when the abutting portion 142 slides, and the amount of iron components attached (a.u. (arbitrary unit)) indicates the amount of such iron components attached to the stator. Using an energy dispersive X-ray analyzer attached to a scanning electron microscope, an amount of iron components was detected from a slide locus over which the abutting portion 142 had slid, and the same was also detected from a region over which the abutting portion 142 had not slid, and the final amount of iron components was obtained as the difference between these detected amounts of iron components attached.

Figure 8:
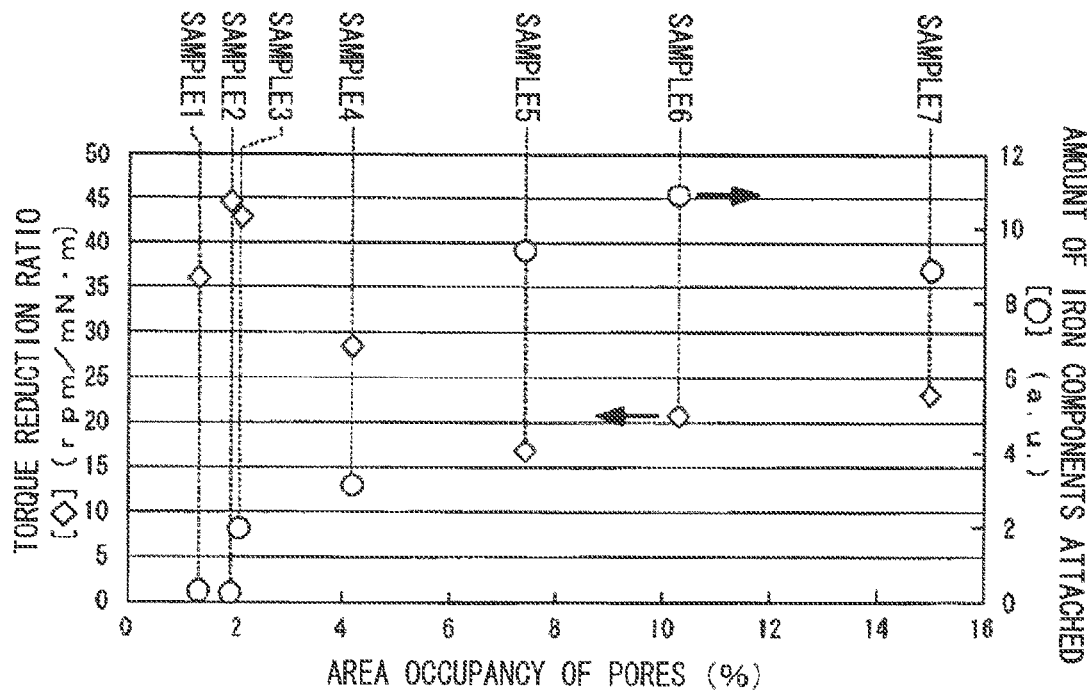
FIG. 8 is a graph showing characteristic of the vibration actuator 100.

FIG. 8 is a graph plotting some of the results of measurements shown in Table 1 and Table 2. FIG. 8 shows relationship between the area occupancy of pores on the contact surface of the stator 130 and the torque reduction ratio (rpm/mN·m) of the vibration actuator 100 and relationship between the same area occupancy of pores and the amount of iron components attached to the stator 130.

As shown in FIG. 8, when the area occupancy of pores on the surface of the stator 130 is 2% or higher, attachment of iron components is remarkable. Further, as the amount of iron components attached increases, the torque reduction ratio of the vibration actuator 100 lowers. Therefore, by setting the area occupancy of pores on the surface of the stator 130 to 2% or higher, it is possible to improve the output torque of the vibration actuator 100.

Further, by setting the area occupancy of pores to 4% or higher, it is possible to further improve the output vibratory, with the torque reduction ratio of the vibration actuator 100 further reduced. FIG. 8 shows that such an effect can likewise be obtained at least when the area occupancy of pores is in the range of up to 15%.

Examining each material in terms of area occupancy of pores in this way, a material with a higher area occupancy of pores invites attachment of more Fe from the stainless material, and can provide an ultrasonic motor that can be driven even under a high load torque. Use of a ceramics material with a high area occupancy of pores realizes high torque and efficiency.

However, the amount of iron components attached does not increase over an area occupancy of pores of 10%, as shown in FIG. 8. Further, with too high an area occupancy of pores, the stator 130 might be likely to deteriorate with many flaws in the surface. Therefore, the area occupancy of pores on the surface of the stator 130 may be 15% or less, or 10% or less.

Figure 9:
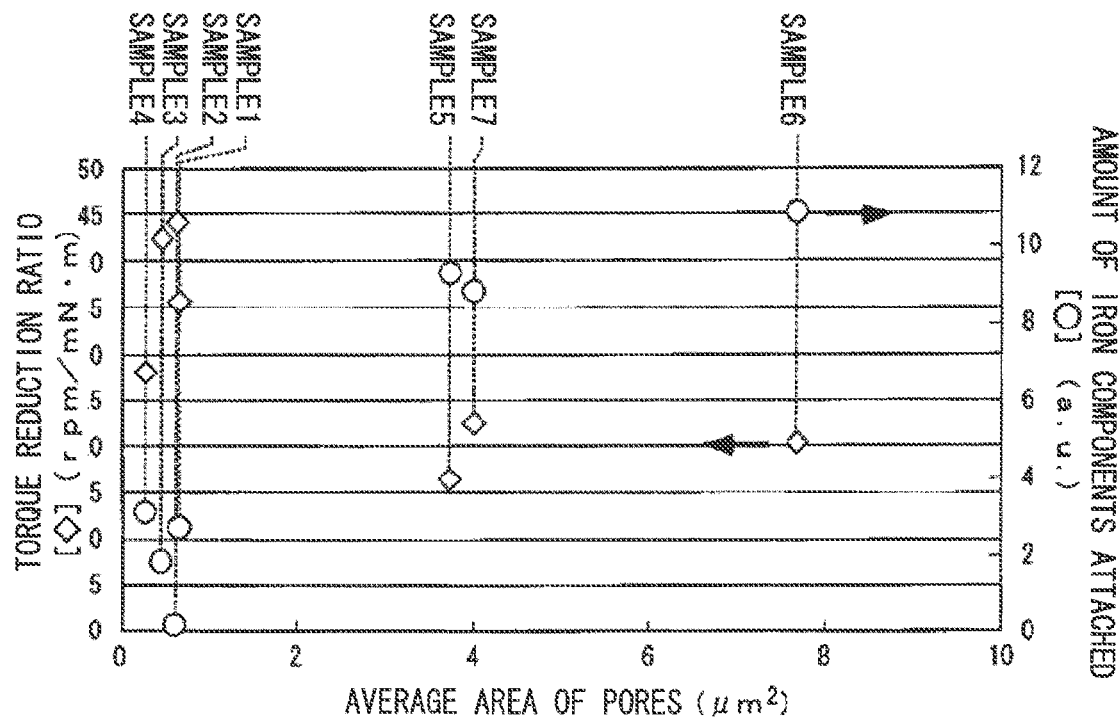
FIG. 9 is a graph showing characteristics of the vibration actuator 100.

FIG. 9 is a graph plotting some of the results of measurements shown in Table 1 and Table 2. FIG. 9 shows relationship between the average area of pore ($\mu m^2$) on the contact surface of the stator 130 and the torque reduction ratio (rpm/mN·m) of the vibration actuator 100 and relationship between the average area of pore ($\mu m^2$) and the amount of iron components attached to the stator 130.

As can be seen from FIG. 9, when the average area of pores is 3 $\mu m^2$ or larger, the amount of iron components attached to the stator 130 is also remarkable. Further, as the amount of iron components attached increases, the torque reduction ratio of the vibration actuator 100 lowers. Therefore, in terms of increasing the torque, the average area of pores may be 3 $\mu m^2$ or larger.

In the example described above, the area occupancy of pores and the average area of pores are substantially uniform all over the surface of the stator 130 contacting the rotor 140. However, even if the distributions of area occupancy of pores and average area of pores are non-uniform, an intended effect can be obtained as long as at least the averages of these parameters taken for the entire surface contacting the rotor 140 fall within the ranges indicated above.

Further, in the example described above, the vibration actuator 100 includes the stator 130 made of ceramics and the abutting portion 142 made of stainless. However, even when the vibration actuator 100 includes a stator 130 made of a metal such as stainless and an abutting portion 142 made of ceramics, it is also possible to improve the drive torque output by the vibration actuator 100 by controlling the area accuracy of pores on the contact surface of the abutting portion 142.

Figure 10:
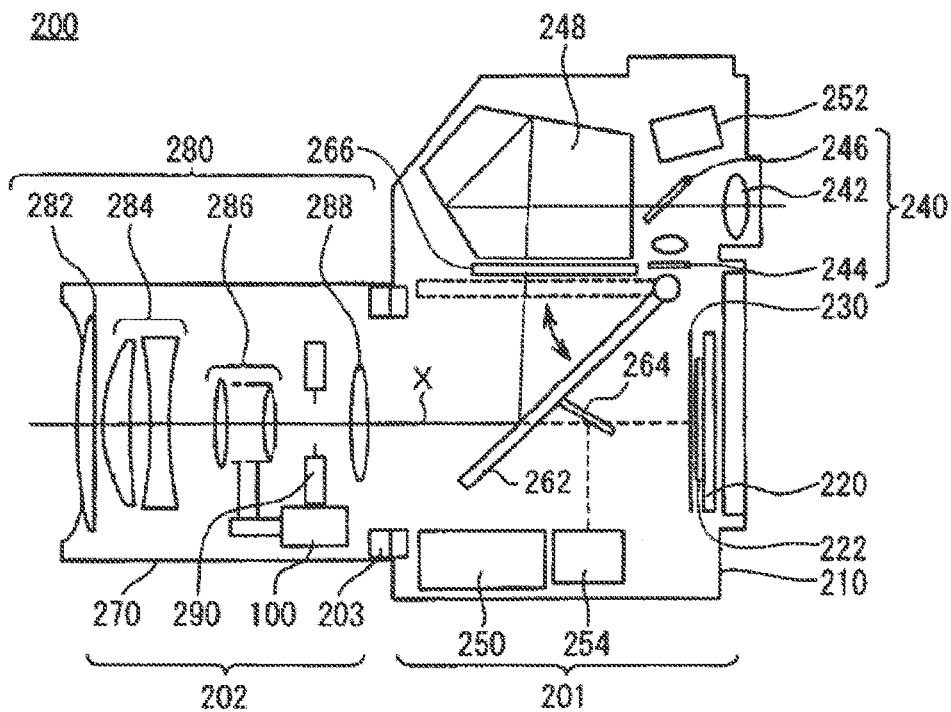
FIG. 10 is an exemplary cross-sectional diagram of a camera 200.

FIG. 10 is an exemplary cross-sectional diagram of a camera 200 provided with the vibration actuator 100. The camera 200 includes a lens unit 202 and a camera body 201.

The lens unit 202 is detachably attached to the camera body 201 through a mount system 203. The lens unit 202 includes an optical system 280, a lens barrel 270 housing the optical system 280, and the vibration actuator 100 provided within the lens barrel 270 for driving the optical system 280.

The optical system 280 includes a front lens 282, a varifocal lens 284, a focusing lens 286, and a main lens 288 sequentially from the entrance end, which is the left-hand side of the drawing. A diaphragm device 290 is provided between the focusing lens 286 and the main lens 288.

The focusing lens 286, which is located in approximately the optical-axis-direction center of the lens barrel 270, has a relatively small diameter, and the vibration actuator 100 is arranged under the focusing lens 286. Therefore, even though the lens barrel 270 does not have a large diameter, the vibration actuator 100 can be housed in the lens barrel 270. The vibration actuator 100 advances or retreats the focusing lens 286 in the direction of the optical axis X through, for example, a gear train.

The camera body 201 houses a finder 240, a control section 250, and a primary mirror 262. The primary mirror 262 changes its position between a slanted position where it is provided slanted on the optical path of a flux of light from an object incident through the optical system 280 of the lens unit 202 and a lifted retracted position (shown in the diagram by a dotted line) where it is kept away from a flux of light from the object.

The primary mirror 262 at the slanted position guides most of a flux of light from an object to a focusing screen 266 provided above. The focusing screen 266 is located at an optically-conjugate position with respect to an image capturing element 220, and an object image formed on the focusing screen 266 passes through a pentaprism 248 to be observed at the finder 240 as a normal erect image. A flux of light from an object is partially guided to a photometric section 252 by the pentaprism 248. The photometric section 252 measures the intensity of a flux light from an object, which corresponds to the luminance of the object, and intensity distribution.

The finder 240 includes an eyepiece 242, a finder display 244, and a half mirror 246. The finder display 244 generates a display image that shows information such as shooting conditions, etc. set on the camera 200. The display image generated by the finder display 244 is superposed on the image on the focusing screen through the half mirror 246. This allows the user to observe the object image formed on the focusing screen 266 and the display image generated by the finder display 244 at the same time at the eyepiece 242.

The primary mirror 262 has a secondary mirror 264 on the back. The secondary mirror 264 guides a flux of light from an object transmitted through the primary mirror 262 partially to a focusing section 254 located thereunder. In this way, when the primary mirror 262 is at the slanted position, the focusing section 254 detects the in-focus position of the focusing lens 286. When the primary mirror 262 moves to the retracted position, the secondary mirror 264 is also kept away from a flux of light from an object.

In the camera body 201, a shutter 230, an optical filter 222, and an image capturing element 220 are provided sequentially at the back of the primary mirror 262 opposite to the lens unit 202. Opening of the shutter 230, which is immediately preceded by moving of the primary mirror 262 to the retracted position, allows a flux of light from an object to travel straightforward to be incident to the image capturing element 220. As a result, the image carried by the incident light is converted to an electric signal by the image capturing element 220.

In the camera 200, the lens unit 202 is electrically coupled to the camera body 201. Therefore, the lens unit 202 is supplied with power from the camera body 201, and operates in cooperation with the camera body 201 under the control of the control section 250 of the camera body 201. Hence, for example, an auto-focusing mechanism can be constructed that controls the amount of rotations and the direction of rotation of the vibration actuator 100 based on information on the distance to the object detected by the focusing section 254 of the camera body 201.

A case has been described in which the focusing lens 286 is moved by the vibration actuator 100, but opening/closing of the diaphragm device 290, moving of a variator lens of the varifocal lens 284, etc. may also be driven by the vibration actuator 100. In this case, the vibration actuator 100 assists in automation of exposure, execution of a scene mode, execution of bracket shooting, etc. by exchanging electric signals with the photometric section 252, the finder display 244, etc. to cross-reference information.

The vibration actuator 100 can be used for other applications than an optical system for an image capturing apparatus, binoculars, etc. Examples include actuators such as precision stages, to be more specific, stages for an electron-beam printing device, a testing apparatus, etc., a moving mechanism for a biotechnological cell injector, a moving bed for a nuclear magnetic resonator, etc.

Figure 11:
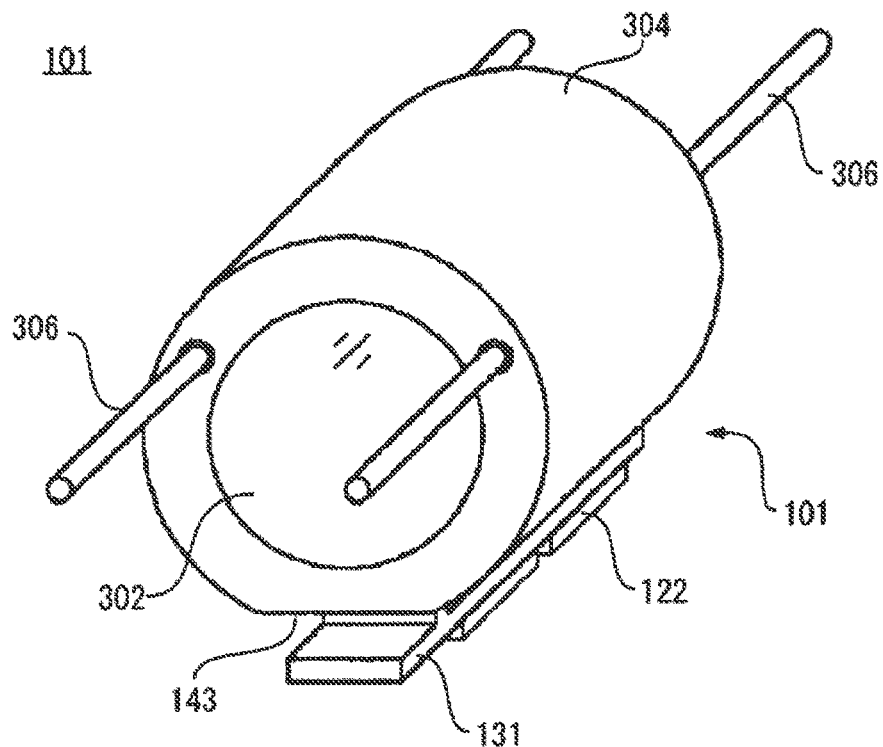
FIG. 11 is an exemplary diagram of an optical device 300 including a vibration actuator 101.

FIG. 11 is an exemplary diagram of an optical device 300 including the vibration actuator 101. The optical device 300 includes an optical component 302, a holding frame 304 and guide shafts 306, and a vibration actuator 101.

The holding frame 304 holds the optical component 302 which may be a lens, etc. A pair of guide shafts 306 are inserted through the holding frame 304 to support the holding frame 304 slidably. The guide shafts 306 are provided in the direction of the optical axis of the optical component 302 in parallel with each other.

The holding frame 304 is formed generally as a cylindrical shape, but has a flat abutting surface 143 as part of the side surface at the bottom of the drawing. The abutting surface 143 is formed in parallel with the axial direction of the guide shafts 306 and constitutes part of the vibration actuator 101. The abutting surface 143 may be formed by machining part of the holding frame 304 or by adding another component to the side surface of the holding frame 304.

The vibration actuator 101 further includes an electromechanical transduction member 122 and a transmission member 131. The electromechanical transduction member 122 and the transmission member 131 are provided on the holding frame 304 at the bottom of the drawing, and abut on the abutting surface 143 provided on the side surface of the holding frame 304.

In the vibration actuator 101, the electromechanical transduction member 122 and the transmission member 131 transmit a driving force to the abutting surface 143 of the holding frame 304 while the electromechanical transduction member 122 and the transmission member 131 are positionally fixed relative to the guide shafts 306. As a result, the optical component 302 moves in the direction of the optical axis along the guide shafts 306 together with the holding frame 304. Consequently, the characteristics of the optical system including the optical component 302 change.

Figure 12:
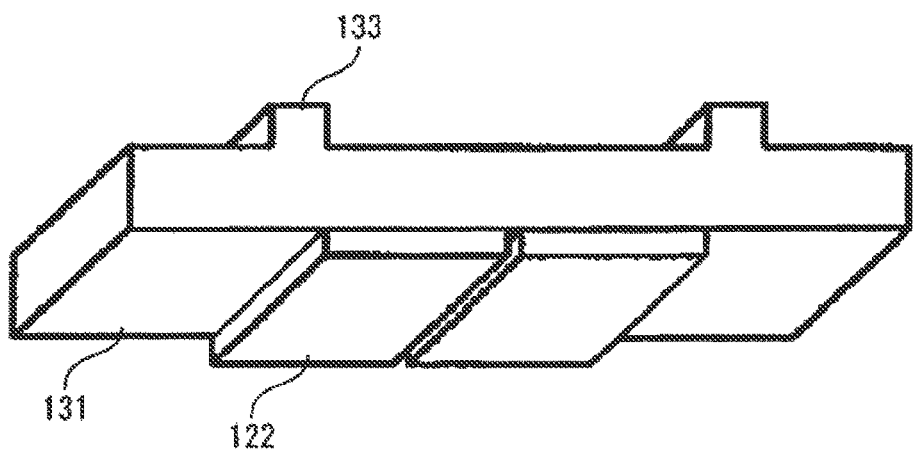
FIG. 12 is a perspective diagram of an electromechanical transduction member 122 and a transmission member 131.

FIG. 12 is a perspective diagram of an assembly in which the electromechanical transduction member 122 and the transmission member 131 are integrated. The transmission member 131 has a shape of a rectangular plate, and includes the electromechanical transduction member 122 at the bottom of the drawing. The transmission member 131 is provided on the top surface thereof with a pair of projections 133 that are spaced apart from each other in the longer direction of the transmission member 131 and project toward the top of the drawing. In the optical device 300, the top ends of the projections 133 abut on the side surface of the holding frame 304.

The electromechanical transduction member 122 includes a pair of piezoelectric blocks made of a piezoelectric material. The piezoelectric blocks are spaced apart from each other in the longer direction of the transmission member 131. The pair of piezoelectric blocks are insulated from each other, and driving voltages can be applied to the piezoelectric blocks independently. Therefore, the piezoelectric blocks can deform the transmission member 131 while they abut on the abutting surface 143 of the holding frame 304.

Figures 13A, 13B, 13C, 13D:
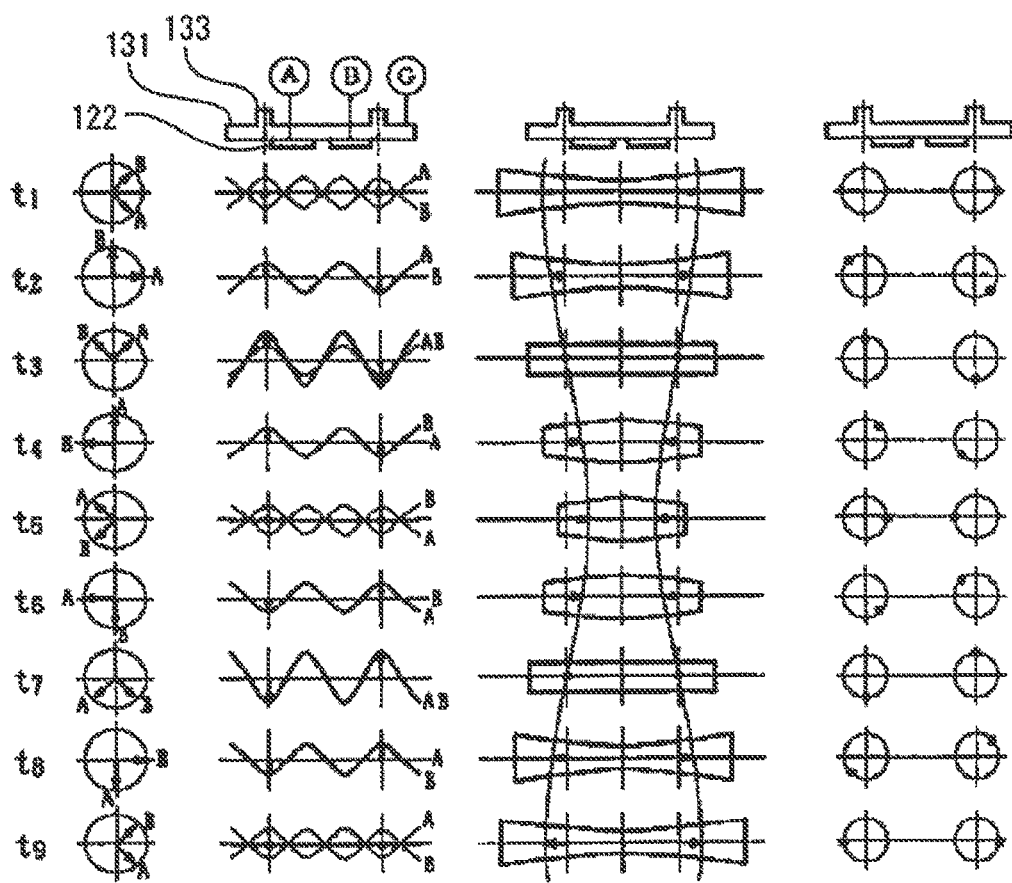
FIG. 13A is an exemplary diagram explaining an operation of the vibration actuator 101.
FIG. 13B is an exemplary diagram explaining an operation of the vibration actuator 101.
FIG. 13C is an exemplary diagram explaining an operation of the vibration actuator 101.
FIG. 13D is an exemplary diagram explaining an operation of the vibration actuator 101.

FIG. 13 are exemplary diagrams explaining the operation of the vibration actuator 101. FIG. 13A shows changes of effective values of two phases of driving voltages A and B applied to the pair of piezoelectric blocks from a timing t1 to a timing t9. The driving voltages A and B cyclically change at a mutual phase difference of 90 degrees.

FIG. 13B shows temporal changes of transverse vibration of the transmission member 131 caused by the electromechanical transduction member 122 to which the driving voltages A and B are applied. Here, transverse vibration is a vibration that, when the transmission member 131 is bent and deformed as a result of shrinkage and expansion of the electromechanical transduction member 122 at a phase difference, causes the transmission member 131 to shift in a direction perpendicular to the longer direction of the transmission member 131. The transmission member 131 has a fourth transverse vibration mode with respect to the changing cycles of the driving voltages A and B.

FIG. 13C shows temporal changes of longitudinal vibration of the transmission member 131 caused by the electromechanical transduction member 122 to which the driving voltages A and B are applied. Here, longitudinal vibration is a vibration that, when the transmission member 131 is shrinked and expanded as a result of expansion and shrinkage of the electromechanical transduction member 122, causes the transmission member 131 to shift in the longer direction of the transmission member 131. The transmission member 131 has a first longitudinal vibration mode with respect to the changing cycles of the driving voltages A and B.

FIG. 13D shows temporal changes of elliptic motion of the top ends of the projections 133 of the transmission member 131 that is caused by composition of the transverse vibration and the longitudinal vibration. The projections 133 are located at positions corresponding to the maximum amplitude of the fourth vibration mode of the transmission member 131. For example, the longer direction center of the transmission member 131 is at a fixed position relative to the guide shafts 306. This causes the top ends of the projections 133 to generate a driving force that drives the abutting surface 143 of the holding frame 304 in the longer direction of the guide shafts 306. Hence, the holding frame 304 moves along the longer direction of the guide shafts 306.

It is possible to improve the output torque of also this vibration actuator 101, by making either the abutting surface 143 or the projections 133 from a metal material and producing pores in the surface of the other at a suitable ratio. To be more specific, for example, the abutting surface 143 on the surface of the holding frame 304 may be made from a ceramics material, etc. having pores in the surface and the transmission member 131 integral with the projections 133 may be made from a metal material.

Figure 14:
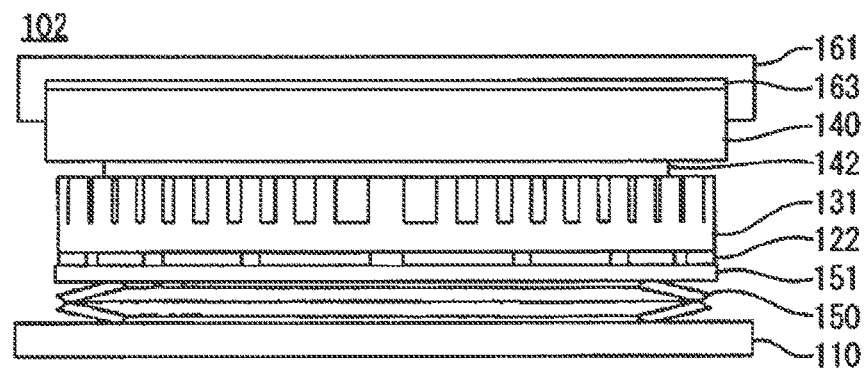
FIG. 14 is a side elevation of a vibration actuator 102.

FIG. 14 is a side elevation of a vibration actuator 102. The vibration actuator 102 includes a base plate 110, a biasing member 150, a pressure applying plate 151, an electromechanical transduction member 122, a transmission member 131, a rotor 140, a cushioning plate 163, and an output member 161, which are stacked in order from the bottom of the drawing.

The biasing member 150 is fixed to the base plate 110 at its bottom end in the drawing. The biasing member 150 generates a biasing force that pushes the pressure applying plate 151 upward. The pressure applying plate 151 pushes the electromechanical transduction member 122 and the transmission member 131 that are integrated with each other upward against the rotor 140. Hence, the transmission member 131 is pushed against an abutting portion 142 that is formed on the rotor 140 on its bottom surface in the drawing.

The rotor 140 is rotatable relative to the base plate 110. The rotor 140 is coupled to the output member 161 through the cushioning plate 163. Hence, of the motions of the rotor 140, a rotary motion is transmitted to the output member 161, causing the rotor 140 and the output member 161 to rotate synchronously about a rotation axis that is parallel with the drawing sheet. A height-direction vibration of the rotor 140 is absorbed by the cushioning plate 163. Therefore, the output member 161 can efficiently transmit the rotary motion outward.

Figure 15:
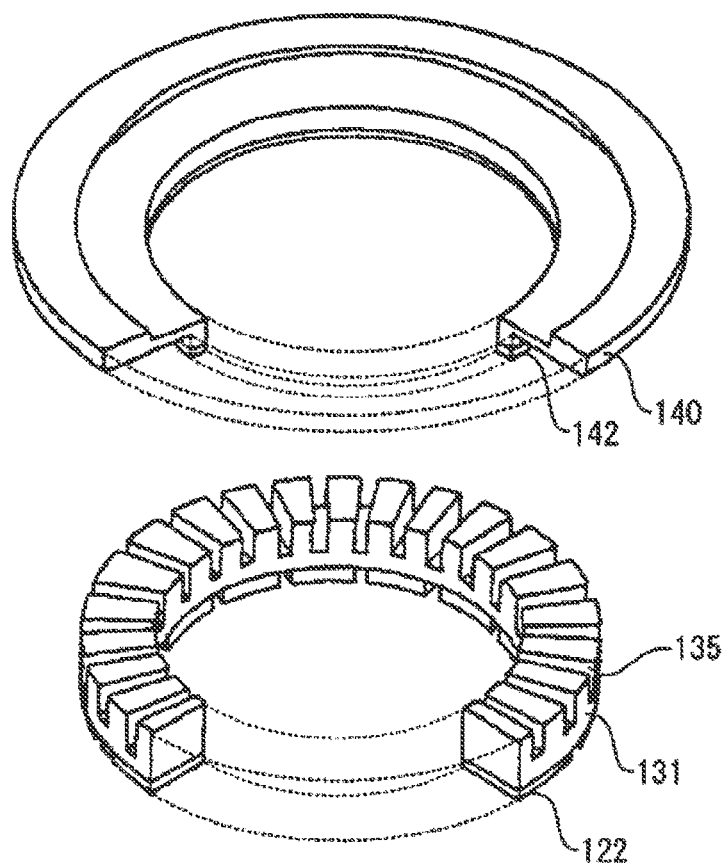
FIG. 15 is a perspective diagram of an electromechanical transduction member 122 and a transmission member 131.

FIG. 15 shows perspective diagrams of an assembly in which the electromechanical transduction member 122 and the transmission member 131 of the vibration actuator 102 are integrated, and of the rotor 140 and the abutting portion 142. Any components that are the same as those in FIG. 14 will be denoted by the same reference numbers, and the same explanation will not be repeated.

In the vibration actuator 102, the electromechanical transduction member 122 includes a plurality of piezoelectric blocks that are provided on the annular transmission member 131 on its bottom surface in the drawing. The plurality of piezoelectric blocks are spaced apart from each other in the circumferential direction of the transmission member 131. A pair of piezoelectric blocks are insulated from each other, and driving voltages can be applied to the piezoelectric blocks independently. Therefore, the piezoelectric blocks can deform the transmission member 131 part by part.

The transmission member 131 includes a plurality of radially-directed grooves 135 in its top surface in the drawing. The grooves reduce the flexural stiffness of the transmission member 131, making the transmission member 131 more susceptible to deformation by the electromechanical transduction member 122.

The rotor 140 has an annular shape on the whole, and has an abutting portion 142 having a small radial-direction width on its bottom end. Hence, the abutting portion 142 is pushed against the transmission member 131 strongly.

Figure 16:
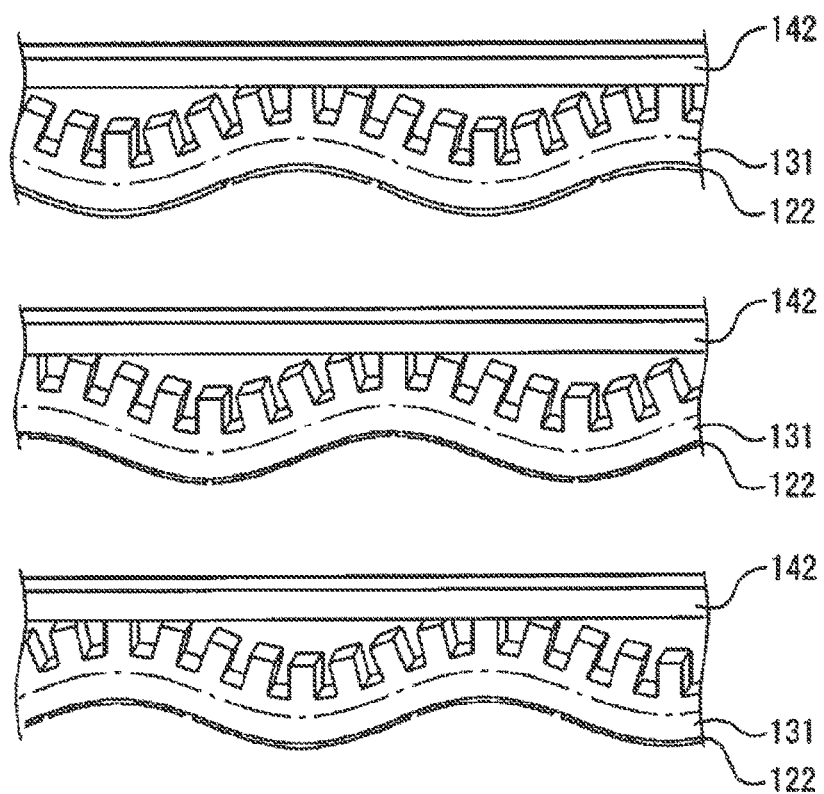
FIG. 16 is an exemplary diagram explaining an operation of the vibration actuator 102.

FIG. 16 is a development diagram of the vibration actuator 102 explaining the operation thereof. As explained with reference to FIG. 13, it is possible to cause the transmission member 131 to vibrate transversely and longitudinally by applying driving voltages changing cyclically at a phase difference to the plurality of piezoelectric blocks arranged in the longer direction of the transmission member 131.

Because the transmission member 131 of the vibration actuator 102 is annular, a traveling wave that travels in the circumferential direction is generated through the transmission member 131 by sequentially shifting the positions at which to generate a transverse vibration. Therefore, a circumferential driving force is transmitted to the annular abutting portion 142 abutting on the transmission member 131, causing the rotor 140 to rotate.

It is possible to improve the output torque of also this vibration actuator 102, by producing pores in the surface of either the abutting portion 142 or the transmission member 131 at a suitable ratio. To be more specific, for example, the abutting portion 142 that is not deformed in the operation of the vibration actuator 102 may be made from a ceramics material having pores in the surface, and the transmission member 131 that is deformed synchronously with generation of a traveling wave may be made from a metal material.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

EXPLANATION OF REFERENCE NUMERALS 100, 101, 102 vibration actuator
110 base plate 120 piezoelectric stack
121, 123, 125, 127 electrode
122 electromechanical transduction member
124 piezoelectric material plate
126 common electrode
130 stator
131 transmission member
132 vibratory
133 projection
135 groove
140 rotor
142 abutting portion
143 abutting surface
150 biasing member
151 pressure applying plate
160 output gear
161 output member
163 cushioning plate
170 bearing member
180 top plate
190 shaft
192 nut
200 camera
201 camera body
202 lens unit
203 mount system
220 image capturing element
222 optical filter
230 shutter
240 finder
242 eyepiece
244 finder display
246 half mirror
248 pentaprism
250 control section
252 photometric section
254 focusing section
262 primary mirror
264 secondary mirror
266 focusing screen
270 lens barrel
280 optical system
282 front lens
284 varifocal lens
286 focusing lens
288 main lens
290 diaphragm device
300 optical device
302 optical component
304 holding frame
306 guide shaft

What is claimed is:

1. A vibration actuator, comprising:
an electromechanical transduction member that transduces electric power to a mechanical vibration;
a transmission member that transmits the vibration from the electromechanical transduction member as a driving force; and
an abutting portion that abuts on the transmission member and moves relative to the transmission member in response to the driving force,
wherein one of the transmission member and the abutting portion includes pores in its surface contacting the abutting portion or the transmission member at an area occupancy of 2% or higher, and
wherein the other of the transmission member and the abutting portion includes iron in a surface thereof contacting the one of the transmission member and the abutting portion.

2. The vibration actuator according to claim 1, wherein an average area of the pores is 3 $\mu m^2$ or larger.

3. The vibration actuator according to claim 1, wherein the other includes martensite stainless steel in its surface contacting the one.

4. The vibration actuator according to claim 1, wherein at least one of the transmission member and the abutting portion includes a sintered compact.

5. The vibration actuator according to claim 1, wherein at least one of the transmission member and the abutting portion includes at least one of a metal oxide, a metal nitride, and a metal carbide.

6. The vibration actuator according to claim 1, wherein the surface of the one of the transmission member and the abutting portion contacting the other is made of alumina, and a surface of the other of the transmission member and the abutting portion contacting the one is made of stainless steel.

7. The vibration actuator according to claim 1, wherein the transmission member includes a stator,
the electromechanical transduction member inclines the stator, and turns direction to which it inclines the stator, and
the abutting portion includes a rotor that contacts the stator and rotates in response to a shift of the stator.

8. The vibration actuator according to claim 1, wherein the transmission member includes a plate-like body and projections that project from the body,
the electromechanical transduction member causes an elliptic motion of the projections by supplying different vibrations having a phase difference, and
the abutting portion abuts on the projections, receives a driving force from the elliptic motion of the projections, and thereby moves relative to the transmission member in one direction.

9. The vibration actuator according to claim 1, wherein the transmission member includes an annular body and a plurality of grooves provided in the body,
the electromechanical transduction member generates in the body a traveling wave that travels in a circumferential direction, by supplying different vibrations having a phase difference, and
the abutting portion includes an annular rotor that contacts the body and rotates in response to the circumferential traveling wave.

10. A lens unit, comprising:
the vibration actuator according to claim 1, and
an optical component that is caused by the vibration actuator to move in a direction of an optical axis.

11. An image capturing apparatus, comprising:
the vibration actuator according to claim 1,
an optical component that is caused by the vibration actuator to move in a direction of an optical axis, and
an image capturing element that picks up an object image formed by the optical component.

12. The vibration actuator according to claim 1, wherein the transmission member includes pores in its surface contacting the abutting portion at an area occupancy of 2% or higher, and the abutting portion includes iron in its surface contacting the transmission member.

* * * * *